Figure 1:
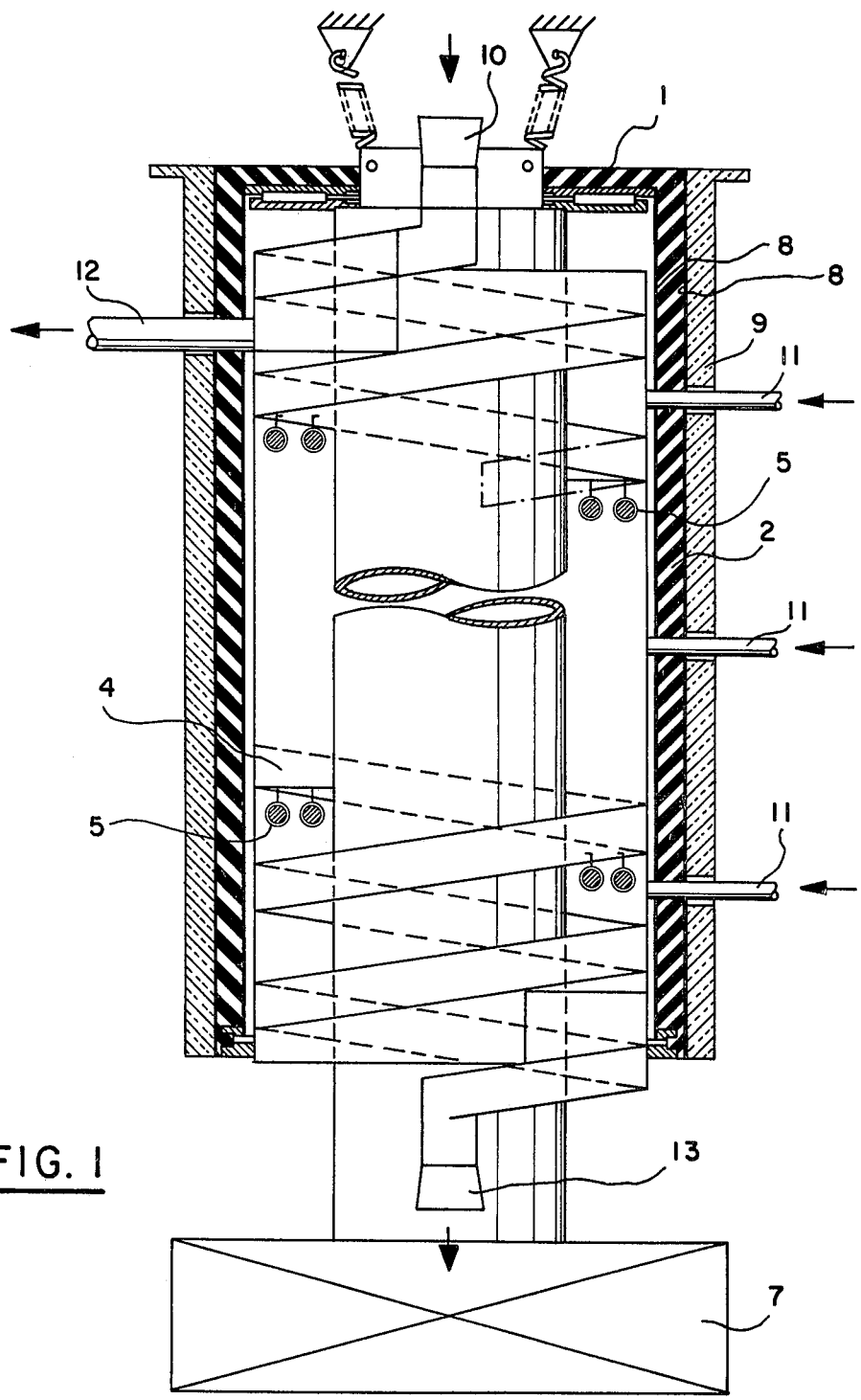

United States Patent [19]

Czerny et al.

[11] 4,083,810

[45] Apr. 11, 1978

[54] PROCESSING OF CATALYST POWDER

[75] Inventors: Thomas Czerny, Glashutten; Hans von Döhren, Frankfurt am Main; Lothar Lösch; August Winsel, both of Kelkheim, Taunus, all of Germany; Kurt Ziegler, deceased, late of Summern, Germany, by Rosemary Ziegler, heir

[73] Assignee: Varta Batterie Aktiengesellschaft, Germany

[21] Appl. No.: 725,637

[22] Filed: Sep. 22, 1976

Related U.S. Application Data

[63] Continuation-in-part of Ser. No. 544,753, Jan. 28, 1975, Pat. No. 4,035,151.

[30] Foreign Application Priority Data

Jan. 29, 1974 Germany .............................. 2403998

[51] Int. Cl.$^2$ ...................... B01J 23/26; B01J 23/74
[52] U.S. Cl. ..................................... 252/467; 252/472
[58] Field of Search .................. 252/411 R, 472, 467; 23/288 B

[56] References Cited

U.S. PATENT DOCUMENTS

| | | | |
|---|---|---|---|
| 3,186,956 | 6/1965 | Cabbage | 252/472 X |
| 3,645,913 | 2/1972 | Habermann | 252/411 R |
| 3,915,890 | 10/1975 | Soldate | 252/411 R |

*Primary Examiner*—W. J. Shine
*Attorney, Agent, or Firm*—Weiser, Stapler & Spivak

[57] ABSTRACT

Catalytic material in powder form flows downwardly along a vibratory spiral conveyor chute, while gas flows counter to the powder, preferably in excess. Mixing ramp arrangements may be provided in the chute.

9 Claims, 3 Drawing Figures

PROCESSING OF CATALYST POWDER

This application is a continuation-in-part of application Ser. No. 544,753, filed Jan. 28, 1975, now U.S. Pat. No. 4,035,151 issued July 12, 1977.

This invention relates to a method of processing catalytic substances by bringing about chemical reactions between a powder and a gas, and particularly to such a method which utilizes a vibratory spiral conveyor for that purpose.

To bring about reactions between powdery and gaseous substances there have been used in the art roasting ovens, or crucibles, rotary kilns, fluidized bed arrangements, and scrubbing columns.

In an oven, the powder to be reacted is treated in a batch process, involving deposition of a relatively thick layer on a grate. The thickness of the layers which are required to process sufficiently large quantities, together with the poor diffusion which prevails, leads to non-uniform reactions. Moreover, these processes take a long time. The resultant products are non-uniform in structure and chemical properties.

Rotary kilns permit higher throughput, and continuous in- and output. However, the non-uniform distribution of the powder to be reacted along the wall of the reaction vessel also leads to formation of a product which is not truly homogeneous. Moreover, the opportunity for contact between gas and powder is limited by the interior surface area and the rate of rotation of the kiln.

Fluidized beds present a problem in that they require high gas velocities in order to entrain the material and maintain it in suspension. The settling rate of the particles depends upon their size. Therefore, fluidized beds are not practical for powders having a broad spectrum of grain sizes, and would yield non-homogeneous products if used for such powders.

Scrubbing columns sometimes also called vertical kilns, involve charging the powder into a container through which the gas flows, generally from the bottom toward the top. Such arrangements can only be operated discontinuously in a batch process, and the powder must have predetermined grain sizes to permit gas passage and also keep the diffusion path short. Furthermore, channels can easily form in the charge, allowing the gas to escape.

Another known type of chemical reactor (see U.S. Pat. No. 2,498,405) utilizes a series of trays positioned in staggered relationship to each other. Vibration of the chamber causes the powdery material being treated to cascade from one tray to the next while being treated with flowing gas.

Vibratory spiral conveyors (see U.S. Pat. Nos. 3,545,609 and 2,983,051) have been used for drying and cooling of powdery substances.

In the art of producing and processing catalysts, it has been conventional to employ a discontinuous process, namely one utilizing a crucible. The material to be treated has been kept in the crucible for an extended period of time, which may last for several hours. This has been predicated on the belief that catalyst production entails a process which proceeds slowly and at the lowest possible temperature. In other words, an extended period of time was deemed necessary to insure development of sufficient catalytic activity and to promote "ripening" of the catalyst.

In the production of a catalyst, the reaction gas must penetrate to each individual grain of powder, if necessary traversing an envelope constituted by the water vapor which develops during the processing. In contrast, drying processes involve, from the standpoint of flow technology, origination processes in which the evolved gases forcibly establish their own flow paths. Because of this difference, those skilled in the art had not given consideration to the feasibility of utilizing, for the production of catalysts, processes and implementing apparatuses similar to some which had previously been utilized for drying purposes.

Accordingly, it is a principal object of the invention to provide a continuous process for the production and processing of catalysts.

It is another object to provide such a process which yields catalysts exhibiting high activity, even though their dwell time in the chemical reactor is comparatively brief.

It is another object to provide such a process which is suitable for treating very fine catalyst powder and in which homogeneity of powder fineness is preserved in the end product.

These objects, and others which will appear, are achieved by utilizing a vibratory spiral conveyor, surrounded by a gas-tight housing, to continuously process powdery, metal alloy containing catalytic material with a reaction gas traversing the spiral conveyor in counterflow direction.

By using a vibratory spiral conveyor it becomes possible to produce a homogeneous, highly active catalyst substance within a very short time. The production time is in the order of minutes, as comprared with hours when crucibles are used. Through the vibration of the powder layer moving along the spiral passage, a pumping effect is produced within this layer which promotes convective access of the reaction gas. In fact, the vibrating conveyor produces an alternating pumping and suction effect which promotes interaction between the gas and the powdery material. This causes the reaction to proceed in a surprisingly short time and exceptionally uniformly.

Even the finest powders can be processed by this technique without the risk of having them entrained and carried away by the reaction gas. By being guided along the spiral path, each individual grain of powder passes through essentially the same positions within the reactor so that the reaction is extremely uniform. By employing the principles embodying the invention, including the counterflow principle utilized, the gas contacting the powder is cleanest at the point at which it comes into contact with the powder leaving the spiral conveyor after it has been processed therein, i.e. where it contacts the finished catalyst.

Moreover, the use of a vibratory spiral conveyor with gas-tight housing makes it easy to establish within the reactor a predetermined temperature profile and to maintain same.

In techniques in which the catalyst raw material is conventionally first calcined and then reduced, these two process steps are carried out concurrently in a vibratory spiral conveyor implementing the present invention. This also leads to a significant shortening of the production in time.

According to the invention, oxidation, reduction or hydration catalysts may all be produced on a mass production scale.

Figure 2A:
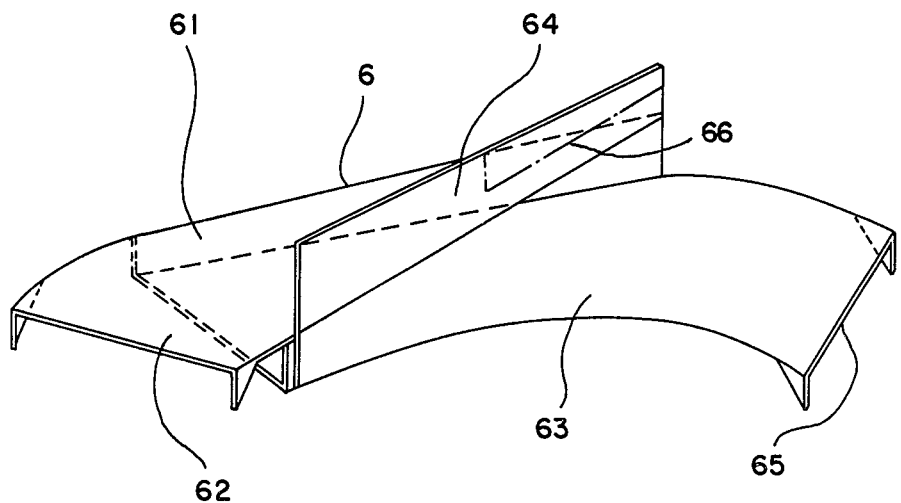
Figure 2B:
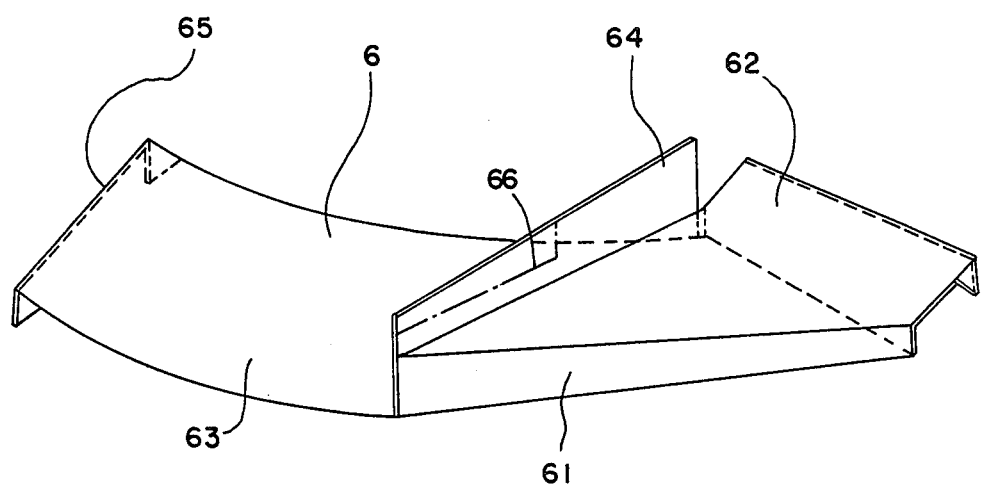

For further details reference is made to the discussion which follows, in the light of the accompanying drawings, wherein FIG. 1 shows, in diagrammatic form, an overall illustration of apparatus which may be utilized in implementing the invention; and FIGS. 2a and 2b show perspective views taken from opposite directions of apparatus for producing intermixing within the powdery material being processed in the apparatus of FIG. 1.

Referring to FIG. 1, this shows a spiral conveyor 1 provided with a gas-tight enclosure consisting of two double-walled half shells 8, whose interstices are filled with silicate beads for thermal insulation. This enclosure can further be surrounded with batting 9 of glass wool.

At the bottom a vibratory drive is provided which may utilize, for example, an oscillating magnet 7 or an eccentric motor drive (not shown).

Where air is used as the reaction gas, the vibratory spiral conveyor and its accessories need not be purged of air by passage of nitrogen before being put into operation; but nitrogen is used where air is not the reaction gas. Subsequently, the nitrogen is evacuated by entrainment with the reaction gas. The appropriate reaction gas pressure is then established, and the reactor is brought to its reaction temperature. The powdery material is then introduced, via a dosing trough, continuously from above into the inlet duct 10 of the spiral conveyor. The powdery material flows along conveyor chute 4, which may be heated by a heating arrangement placed beneath it, e.g. by heating rods 5, or it may be cooled by appropriate cooling means. This chute is caused to reciprocate along its axis by means of the vibrating drive discussed above. The powdery material is intermixed if desired by means of one or more mixing means positioned along the conveyor chute. The comparatively thin layer of powdery material thus moving from top to bottom is brought into contact with an excess of reaction gas traversing the spiral conveyor in counter-flow direction. This gas is introduced through inlets 11 at different heights along the vibratory spiral conveyor, contacted with the powder and reacted. At the lower end of the spiral conveyor, the powdery material is continuously withdrawn through an outlet duct 13. The gaseous reaction products are exhausted, along with the reaction gas stream, and are freed in conventional manner of entrained fine powder dust.

It has proven particularly desirable to use, as intermixing means, mixing ramp arrangements 6 positioned within conveyor chute 4. One such mixing ramp arrangement 6 is shown in FIGS. 2a and 2b in perspective views taken from opposite sides. It includes two surfaces 62, 63, separated from each other by a vertical partition 61. The upper surface 52 starts from the middle of the cross-section of the powder layer within the duct. The lower surface 63 starts from the bottom of the conveyor chute. Both rise along partition 61, in the direction in which the powder being mixed moves along the conveyor chute. Upper surface 62 is provided with an up-turned lip 64 which bounds that surface in the direction of powder movement. A space is provided between partition 61 and the side wall of conveyor chute 4.

By means of this mixing ramp arrangement 6 the cross-section of the powdery layer is divided into two horizontally superposed halves. The half-layer which moves along the upper surface 62 drops off that surface and becomes deposited beneath the slightly rising lower surface 63, whereas the half-layer guided onto lower surface 63 drops over edge 65 onto the powder half-layer which emerges from beneath that edge. Thus, the initially lower layer becomes superposed on the initially upper layer.

If desired, there may also be cut out of up-turned lip 64 the portion indicated by dot-dash line 66 in FIGS. 2a and 2b. This permits powder moving up surface 62 to be discharged onto surface 63 in case the space between the sidewall of chute 4 and partition 61 becomes clogged, thereby inhibiting the normal flow of material.

Examples 1 to 3 which follow further describe the production and processing of catalysts in accordance with the invention.

EXAMPLE 1

PRODUCTION OF A COPPER CHROMITE CATALYST FOR SELECTIVE HYDRATION, UTILIZING AIR AS OXIDIZING GAS

In an ammonia solution, a di-chromate is obtained as a fine powder by precipitation with sodium chromate from copper nitrate. The composition has the formula $[Cu(NH_3)_2](NH_4)_2 \cdot (CrO_4)_2$. This powder is thoroughly washed and substantially freed of water by drying. Subsequently, the powder is continuously decomposed in the spiral conveyor reactor by counterflow of a preheated air current, at 300 to 350° C and with a layer thickness of 10 to 20 mm. This involves the following reaction:

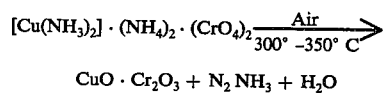

$$CuO \cdot Cr_2O_3 + N_2 NH_3 + H_2O$$

The gaseous reaction products are removed through condensation ($H_2O$) and scrubbing with water ($NH_3$). The nitrogen is purged out with the air stream. The grain size may be varied within wide limits depending upon the grain size of the di-chromate. The catalyst produced in this manner is particularly suitable for selective hydration of carbonyl groups: aldehydes and ketones are reduced to alcohols, esters, and carboxylic acids. Likewise amides are reduced to amines.

EXAMPLE 2

PRODUCTION OF A NICKEL CARRIER CATALYST FOR LARGE SCALE FAT RENDERING

The mass of nickel carrier catalyst consists of basic nickel carbonate precipitated onto silicate beads. It is introduced continuously into the spiral conveyor reactor, at a reaction temperature between 350° and 500° C and a layer depth between 1 and 10 mm. Hydrogen gas is introduced in counterflow manner in excess (about 10 times stochiometric quantity). The hydrogen is heated to the reaction temperature before introduction into the reactor. At a dwell time between 5 to 20 minutes, the basic carbonate is then completely reduced to very finely divided nickel. This endothermic reaction takes place in accordance with the following equations:

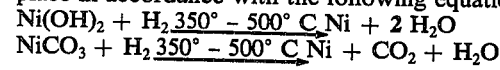

These reactions are promoted by utilizing short diffusion paths for the gaseous reactants and by rapid removal of reaction water and carbon dioxide. Furthermore, the continuous occurrence of the reduction in a thin layer makes possible very uniform heat supply, which in turn assures a uniform product.

The gaseous reaction products ($CO_2$, $H_2O$ vapor) entrained in the hydrogen stream are removed without difficulty by absorption or condensation in a scrubbing column.

The catalysts produced in accordance with the foregoing process exhibit 10 to 20% higher hydrogenation activity than those produced by conventional processes.

EXAMPLE 3

Nickel carrier catalysts of the type described in Example 2, contain among other impurities, nickel after they have been used for fat rendering. Because of environmental pollution problems, this nickel content has been creating increasing difficulties in the disposal of such wastes. Therefore a process for recovering the nickel from the catalyst wastes is much sought after.

It has been found that it is possible to free the spent catalyst of nickel, after removal of the main fat quantities, by passing the material through a spiral conveyor reactor a few degrees below 100° C, in counterflow to a CO gas stream. In the course of the reaction, carbonyl nickel is produced as an unstable intermediate compound, removed from the reactor by the circulating CO, and decomposed into nickel powder and CO at 180° C. In this way, the nickel is recovered as a valuable material of high purity, and the carrier substance which leaves the spiral conveyor at the bottom can be reused.

An additional class of processes to which use of the spiral conveyor reactor is well suited, are catalytic gas treatment processes, in which regeneration of the catalyst is required after a predetermined reaction period. An example is the catalytic treatment of natural gas or petroleum derivatives which in many cases lead to poisoning of the catalyst by sulfur content. Continuous circulation of the catalyst through the spiral conveyor permits its regeneration outside the treatment reactor, with most economical utilization. This minimizes the consumption of these usually expensive catalysts and thereby reduces the required investment of capital.

From these examples it is evident to one skilled in the art that the invention is particularly suitable for producing catalytically active metal powders with highly desirable characteristics.

Due to the fact that the powder grains are moved along by vibration, agglomeration is prevented. By increasing the amplitude of the vibration, even powder which does not flow easily can be treated. Because the gas is supplied in excess, the equilibrium of the chemical reaction is displaced in favor of the end product and this reduces the dwell time of the powder in the vibratory spiral conveyor. The impediments to diffusion which characterize previous known techniques are considerably reduced by the invention and heretofore customary dwell times of a few hours can typically be reduced to a few minutes.

Because, in accordance with the invention, heat is supplied both from below by a heater arrangement positioned below the chute of the spiral conveyor, and from above (through radiation) and through convection by means of the reaction gas, very uniform heating of the powdery material is achieved. This also contributes appreciably to the uniformity of the end product achievable by means of the invention.

It is again emphasized that the use of a vibrating spiral conveyor as described herein has unexpected and remarkable advantages in the processing of catalytic materials. The smooth, gradual movement of the powder down the chute, while continuously interacting with the reaction gas, contributes to a much more rapid achievement of a uniform end product than had been thought possible. Because of the counterflow of reactant gas to the powder, there is a particularly desirable match between the gas and the powder. At the outlet from the vibratory spiral conveyor, where the catalyst is most fully reacted, the gas is also at its purest, and these characteristics then vary correspondingly in the powder and gas in the direction of the inlet to the vibratory spiral. Also, the use of a vibratory spiral chute is conducive to a uniformity of power layer along the entire length of the chute, and this is highly desirable for achieving a uniform catalyst as the end product. In particular, it enables a control of the reaction throughout its entire duration (as the powder moves in a layer of uniform thickness along the spiral conveyor chute) which is particularly desirable when dealing with catalysts which are notoriously sensitive to fluctuations in reaction conditions.

This was not taught in the prior art, either of catalyst processing, or of vibratory conveyor technology.

We claim:

1. The method of processing a powdery material containing material capable of being a catalyst, utilizing a vibratory spiral conveyor which includes a spiral chute having its axis positioned generally vertically, a chamber enclosing the chute and means for producing axial vibration of the chute, the method comprising the steps of:

introducing the powdery material at the top of the chute while causing the chute to reciprocate along its axis so as to cause the material to vibratingly move downward along the chute in a substantially uniform thickness layer;

passing reaction gas in counterflow manner respective the powder so as to contact and react with the powder layer moving down the chute, the vibratory movement producing an alternating pumping and suction effect which improves the convective access of the gas to the powdery material and thereby the reaction;

maintaining gas and powder temperatures appropriate for the reaction;

removing the gaseous reaction products near the top of the spiral conveyor; and withdrawing the processed catalyst material near the bottom of the spiral conveyor.

2. The method of claim 1 further comprising intermixing the powder moving down the spiral conveyor chute.

3. The method of claim 2, wherein said intermixing comprises dividing the powder flow into plural superposed layers, and guiding said layers along said chute so that an initially lower layer becomes superposed upon an initially upper layer.

4. The method of claim 1, wherein said reaction gas is supplied in excess.

5. The method of claim 1, wherein the vibrating spiral conveyor is operated with such parameters that the powdery catalyst material has a dwell time of a few minutes in the conveyor.

6. The method of claim 1, wherein the catalyst powder is both calcined and reduced within the vibratory spiral conveyor.

7. The method of claim 1, wherein the powdery material introduced into the conveyor is $[Cu(NH_3)_2] \cdot (NH_4)_2 \cdot (CrO_4)_2$, the reaction gas is air heated to about 300°–350° C, and the conveyor is operated with such parameters that the material descends the chute in a substantially uniform layer of about 10–20mm thickness.

8. The method of claim 1, wherein the powdery material is $Ni(OH)_2$ and the reaction gas is hydrogen at a temperature of about 350°–500° C, and the conveyor is operated with such parameters that the powder descends the chute in a substantially uniform layer of about 1–10mm thickness and a dwell time of about 5–10 minutes.

9. The method of claim 1, wherein the powdery material is a catalyst contaminated with nickel, and the reaction gas is CO at about 180° C.

* * * * *